(12) United States Patent
Wang

(10) Patent No.: US 7,872,866 B1
(45) Date of Patent: Jan. 18, 2011

(54) HARD DISK DRIVE MOUNTING STRUCTURE AND COMPUTER INCORPORATING THE SAME

(75) Inventor: Jin Wang, Shenzhen (CN)

(73) Assignees: Fu Zhun Precision Industry (Shen Zhen) Co., Ltd., Shenzhen, Guangdong Province (CN); Foxconn Technology Co., Ltd., Tucheng, Taipei County (TW)

( * ) Notice: Subject to any disclaimer, the term of this patent is extended or adjusted under 35 U.S.C. 154(b) by 0 days.

(21) Appl. No.: 12/560,350

(22) Filed: Sep. 15, 2009

(30) Foreign Application Priority Data

Jul. 20, 1920 (CN) .......................... 2009 1 030455

(51) Int. Cl.
*H05K 7/20* (2006.01)
(52) U.S. Cl. ............. 361/695; 361/679.46; 361/679.47; 361/679.48; 361/679.49; 361/679.54; 174/16.1; 174/16.2; 165/80.3; 165/122; 454/184
(58) Field of Classification Search ........................ None
See application file for complete search history.

(56) References Cited

U.S. PATENT DOCUMENTS

| | | | | |
|---|---|---|---|---|
| 5,171,183 A | * | 12/1992 | Pollard et al. ............... | 454/184 |
| 5,600,538 A | * | 2/1997 | Xanthopoulos .......... | 361/679.6 |
| 6,198,633 B1 | * | 3/2001 | Lehman et al. ............. | 361/756 |
| 6,657,858 B2 | * | 12/2003 | Rothschild ............. | 361/679.33 |
| 6,918,174 B2 | * | 7/2005 | Kim et al. ................. | 29/603.04 |
| 7,525,802 B2 | * | 4/2009 | Yu et al. ..................... | 361/701 |
| 7,559,781 B2 | * | 7/2009 | Yuh .......................... | 439/159 |
| 7,580,265 B2 | * | 8/2009 | Kumagai et al. ............ | 361/719 |
| 7,586,746 B2 | * | 9/2009 | Liu ............................ | 361/695 |
| 7,742,296 B2 | * | 6/2010 | Lai et al. .................. | 361/679.5 |
| 2009/0279244 A1 | * | 11/2009 | Crippen et al. ......... | 361/679.33 |

FOREIGN PATENT DOCUMENTS

CN 2503571 Y 7/2002

* cited by examiner

*Primary Examiner*—Boris L Chervinsky
(74) *Attorney, Agent, or Firm*—Frank R. Niranjan

(57) ABSTRACT

A computer includes a casing; the computer further comprises a motherboard, a hard disk drive mounting structure and a hard disk drive accommodated in the casing. The motherboard is mounted on a fixing plate of the casing. The hard disk drive mounting structure is located above the motherboard, and includes a heat dissipation apparatus including a heat sink, a mounting frame, and a supporting bracket connected between the mounting frame and a base of the heat sink. A bottom end of the supporting bracket is fixed to the base of the heat sink. A top end of the supporting bracket is fixed to one end of the mounting frame to support the mounting frame, which has another end fixed to a side plate of the casing. The hard disk drive is mounted on the mounting frame.

17 Claims, 6 Drawing Sheets

HARD DISK DRIVE MOUNTING STRUCTURE AND COMPUTER INCORPORATING THE SAME

BACKGROUND

1. Technical Field

The present disclosure relates to computers, and particularly to a computer incorporating a hard disk drive mounting structure which can reduce a size of the computer.

2. Description of Related Art

In a computer, a hard disk drive is an important component for storing data. Usually, a special mounting structure is provided to firmly mount the hard disk drive in a casing of the computer, to thereby prevent the hard disk from being damaged by vibration.

For example, Chinese Patent Issued No. CN 2503571Y discloses a mounting structure for mounting a hard disk drive in a desktop computer. The mounting structure includes a positioning plate, a pair of mounting plates, and a locking plate. The positioning plate and the pair of the mounting plates integrally extend upwardly from a fixing plate of the computer on which a motherboard is mounted. The hard disk drive is firmly mounted on the fixing plate via engagement between the pair of mounting plates and the locking plate. However, both the hard disk drive and the motherboard are mounted on the fixing plate. An inner space of the casing of the computer is insufficiently utilized. Therefore, the computer incorporating the above-mentioned hard disk drive mounting structure has a larger size, which can not meet the tendency of miniaturizing the computer.

For the foregoing reasons, therefore, there is a need in the art for a computer which overcomes the limitations described.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION

Figure 1:
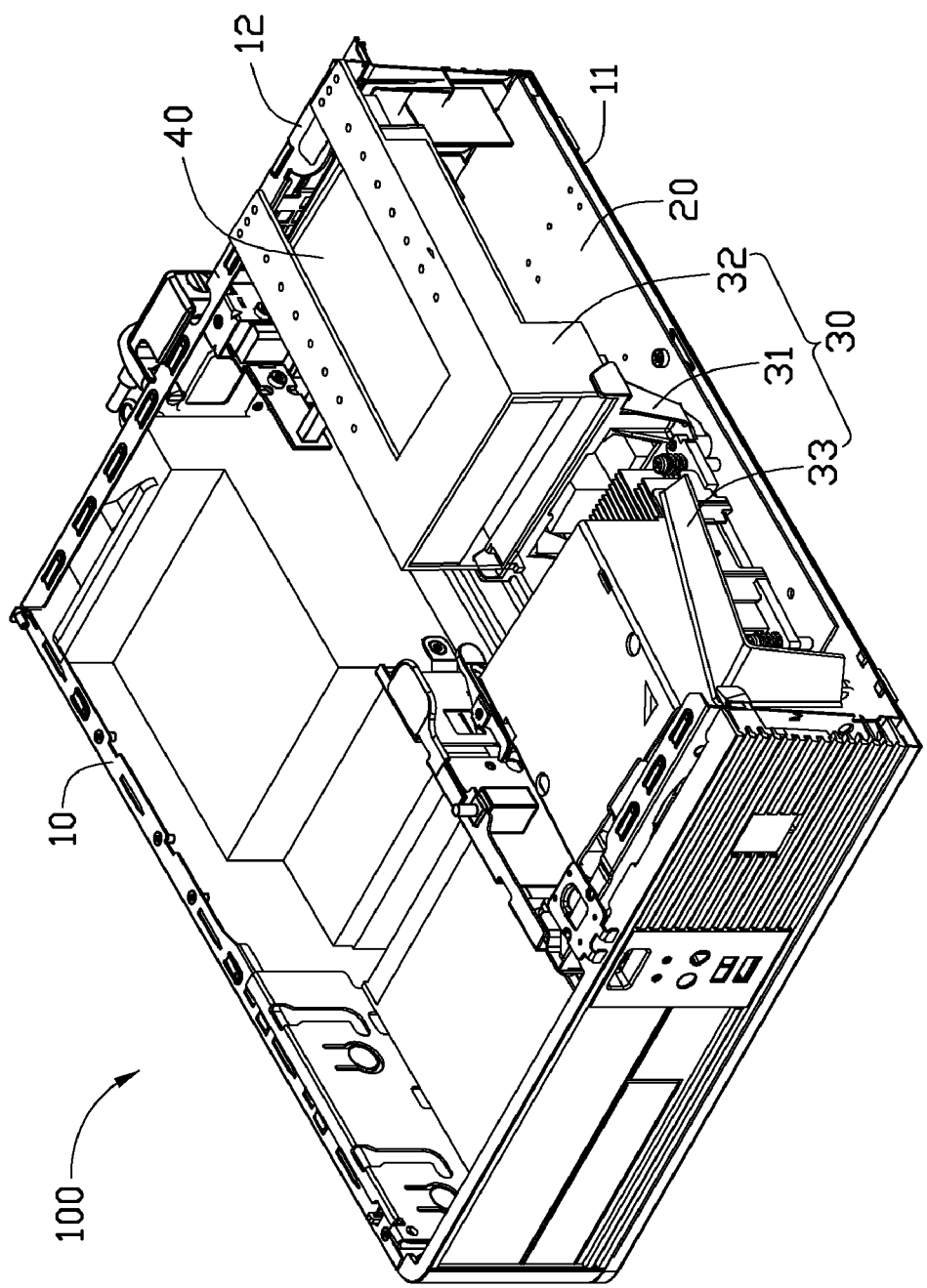
FIG. 1 is an assembled, isometric view of a computer in accordance with an exemplary embodiment.

Referring to FIG. 1, a computer 100 according to an exemplary embodiment includes a cuboid casing 10, a motherboard 20, a hard disk drive (HDD) 40, and a HDD mounting structure 30 for supporting the HDD 40 in position. The casing 10 is used for accommodating the motherboard 20, the HDD mounting structure 30, the HDD 40 and other components of the computer 100 such as optical disk drive, central processing unit (CPU), etc. For clearly showing the elements in the casing 10, a top cover and a right side plate of the casing 10 are not shown. The casing 10 has a fixing plate 11 at a bottom side thereof. The motherboard 20 is mounted on the fixing plate 11 of the casing 10. The HDD mounting structure 30 is located above the motherboard 20.

Figure 2:
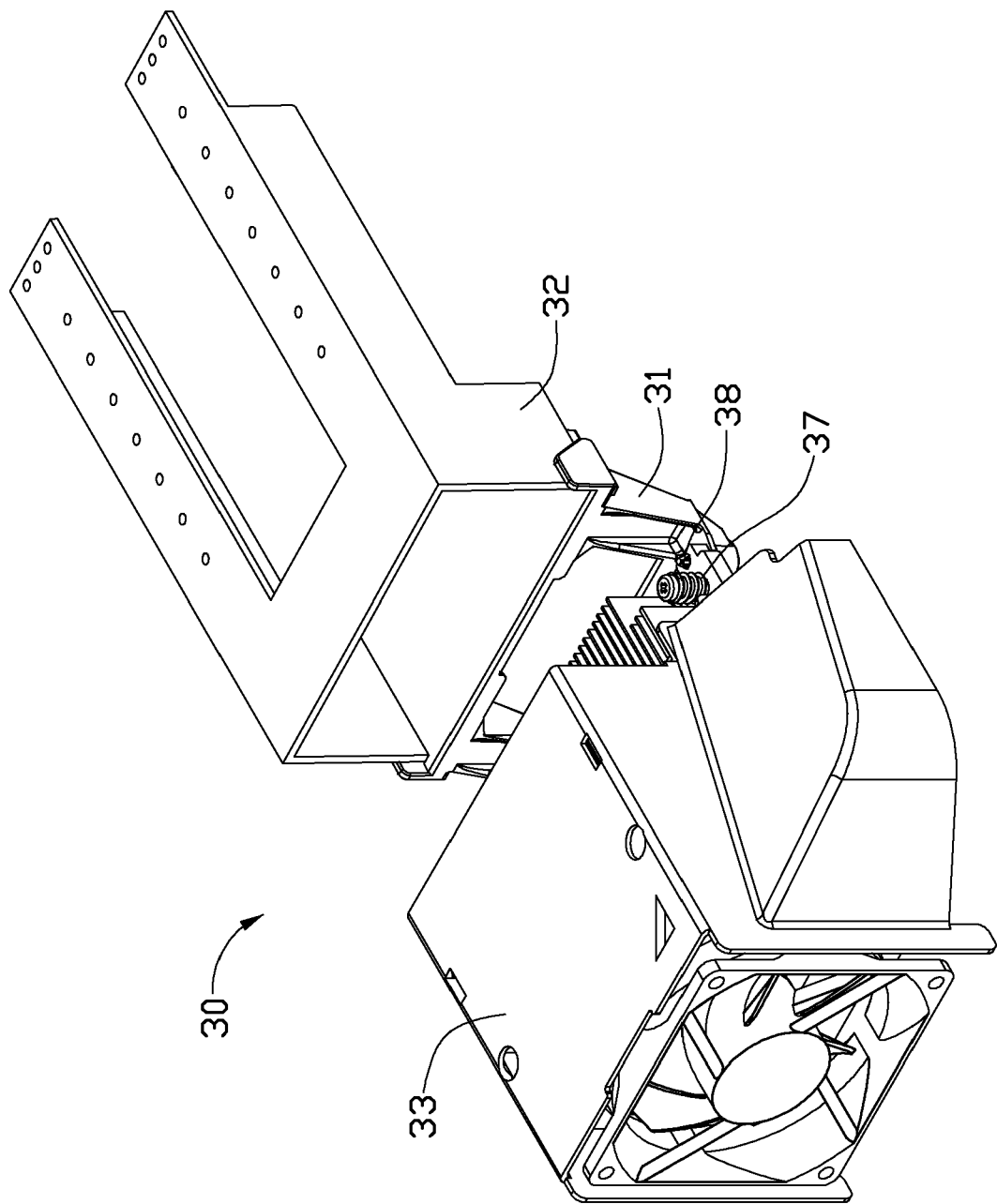
FIG. 2 is an assembled, isometric view of a hard disk drive mounting structure of the computer of FIG. 1.
Figure 3:
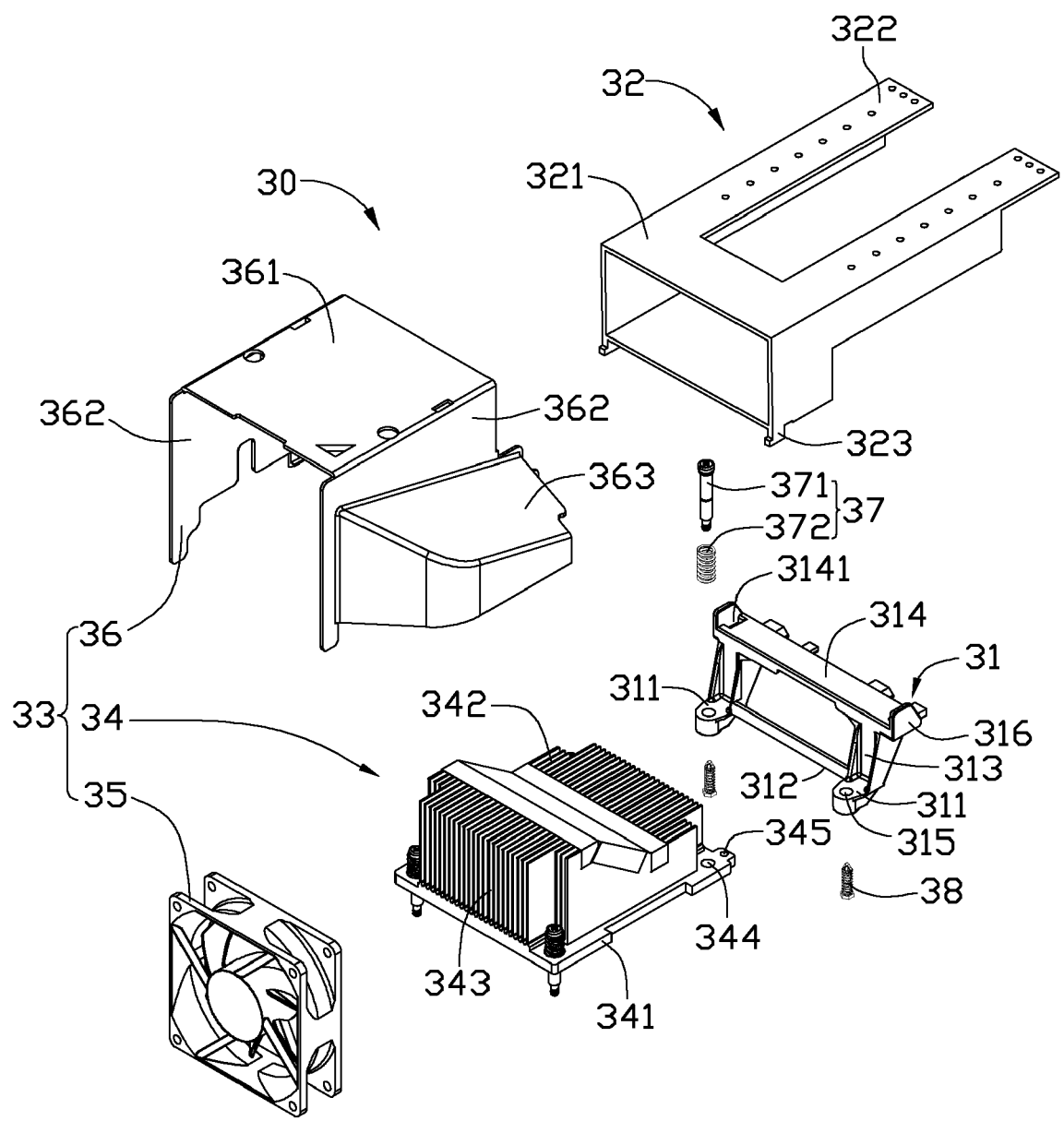
FIG. 3 is an exploded, isometric view of the hard disk drive mounting structure of FIG. 2.

Referring to FIGS. 2 and 3, the HDD mounting structure 30 includes a supporting bracket 31, a mounting frame 32 and a heat dissipation apparatus 33. The supporting bracket 31 is connected between the mounting frame 32 and the heat dissipation apparatus 33. The heat dissipation apparatus 33 is used for dissipating heat from a main heat generating electrical component such as the CPU. The heat dissipation apparatus 33 includes a heat sink 34, a fan 35 and a fan duct 36. The heat sink 34 includes a rectangular base 341 and a plurality of parallel fins 342 arranged on the base 341. The fins 342 extend from a front end (i.e., an end far from the supporting bracket 31) toward a rear end (i.e., an end adjacent to the supporting bracket 31) of the base 341. An air passage 343 is defined between every two adjacent fins 342, and extends along a front-to-rear direction.

Figure 4:
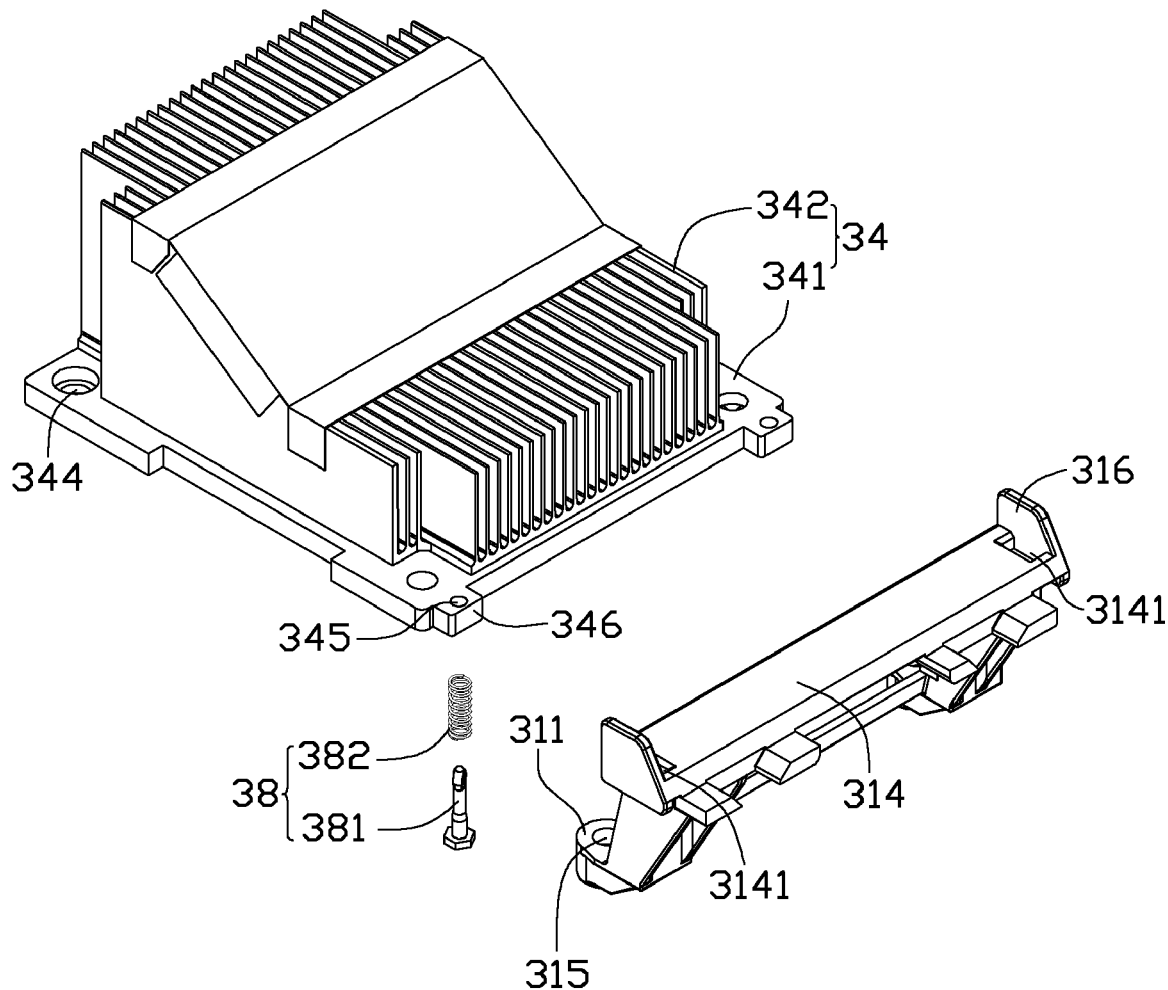
FIG. 4 shows a heat sink and a supporting bracket of the hard disk drive mounting structure of FIG. 3.
Figure 5:
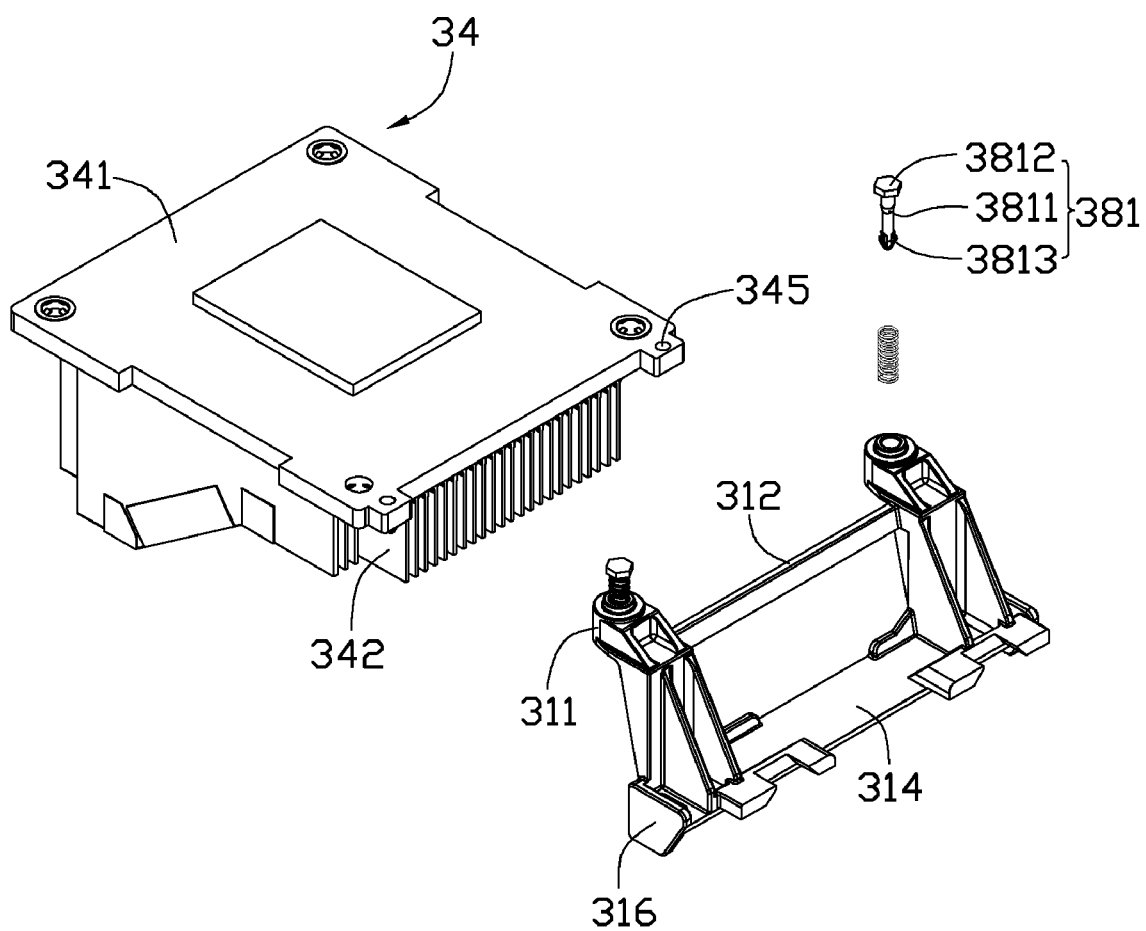
FIG. 5 is similar to FIG. 4, but viewed from another aspect.

Referring also to FIGS. 4 and 5, the base 341 defines four through holes 344 at four corners thereof, respectively. Four fasteners 37 extend through the four through holes 344 of the base 341 to mount the heat sink 34 on the CPU arranged on the motherboard 20. Each fastener 37 includes a bolt 371 and a coil spring 372 disposed around the bolt 371. Heat generated by the CPU is absorbed by the base 341 of the heat sink 34 and then transferred to the fins 342 for further dissipation. The rear end of the base 341 forms two flanges 345 at left and right sides thereof, respectively. A mounting hole 345 is defined in each of the flanges 345 adjacent to a corresponding through hole 344 of the base 341.

The fan 35 is located at the front end of the heat sink 34. Airflow produced by the fan 35 flows through the air passages 343 to exchange heat with the fins 342 of the heat sink 34, to thereby take away heat generated by the CPU. The fan duct 36 covers the heat sink 34 and the fan 35 therein to guide the airflow produced by the fan 35 through objects needing heat dissipation.

Figure 6:
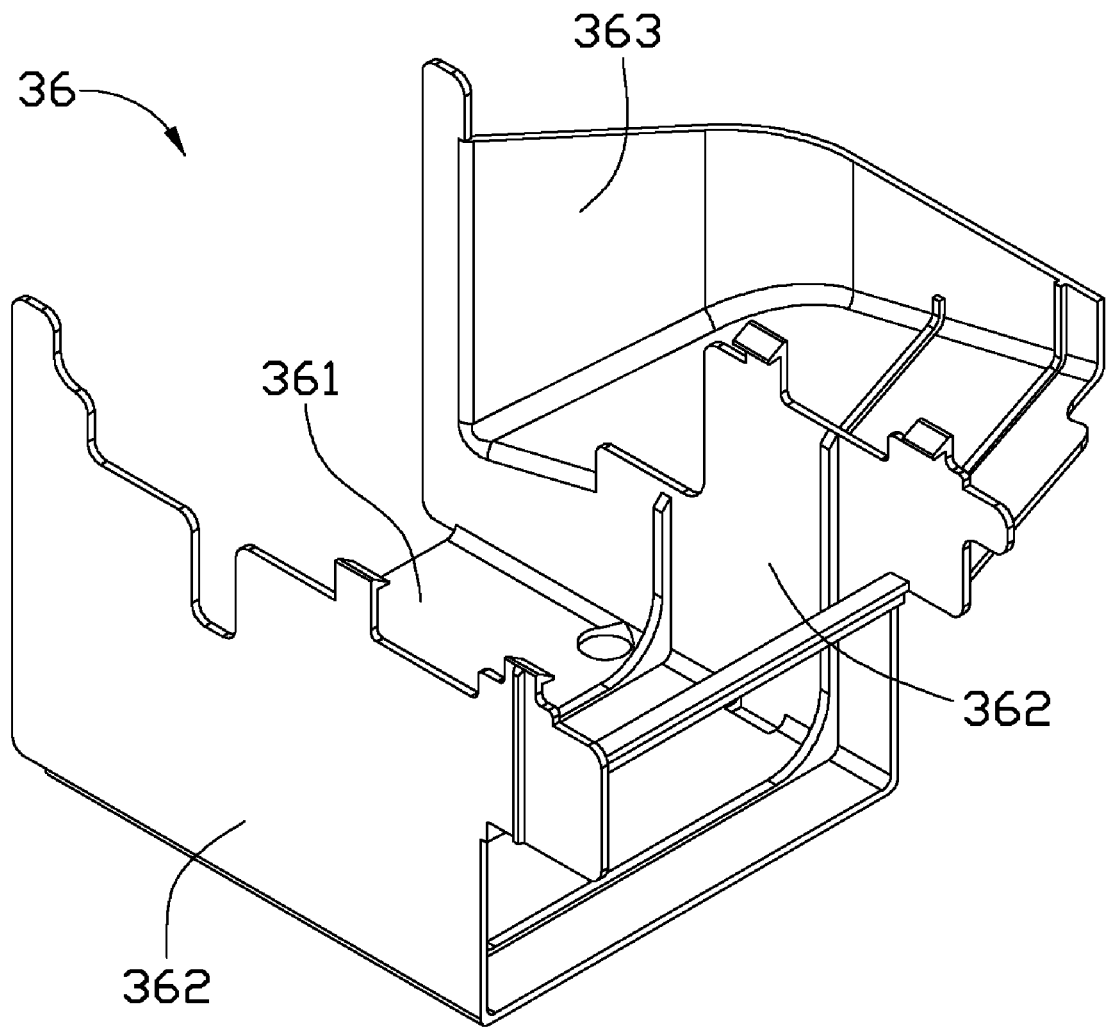
FIG. 6 is an isometric view of a fan duct of the hard disk drive mounting structure of FIG. 3.

Referring also to FIG. 6, the fan duct 36 includes a top plate 361 and a pair of side plates 362 extending downwardly from two opposite sides (left and right sides) of the top plate 361, respectively. A diffluent duct 363 is connected to one side plate 362 at the right side of the fan duct 36.

Referring to FIG. 1 again, when the fan duct 36 covers on the heat sink 34, the top plate 361 of the fan duct 36 is higher than top ends of the fins 342, and a spacing is defined between the top plate 361 of the fan duct 36 and the top ends of the fins 342 of the heat sink 34. The spacing is aligned with the HDD 40. A portion of the airflow produced by the fan 35 flows through the air passages 343 defined between the fins 342 of the heat sink 34 to exchange heat with the fins 342. Another portion of the airflow produced by the fan 35 flows through the spacing towards the HDD 40 to dissipate heat generated by the HDD 40 thereby keeping the HDD 40 working under a normal temperature. Other portion of the airflow produced by the fan 35 flows through the diffluent duct 363 to dissipate heat generated by other heat generating electrical components (not shown) on the motherboard 20.

The supporting bracket 31 is located at the rear end of the heat sink 34. A bottom end of the supporting bracket 31 is assembled to the base 341 of the heat sink 34 via a pair of fasteners 38. A top end of the supporting bracket 31 connects with a front end 321 of the mounting frame 32. The supporting bracket 31 includes a pair of platforms 311 at the bottom end thereof, a connecting plate 312 connected between the pair of platforms 311, a pair of legs 313 respectively extending upwardly from the pair of platforms 311, and a supporting plate 314 connected between top ends of the pair of legs 313.

The connecting plate 312, the pair of legs 313 and the supporting plate 314 cooperatively from the rectangular, hollow supporting bracket 31 facing the spacing formed between the top plate 361 of the fan duct 36 and the fins 342 of the heat sink 34. Each of the pair of platforms 311 defines a through hole 315 therein corresponding to the mounting hole 345 of the flange 346 of the base 341 of the heat sink 34. Each fastener 38 includes a pin 381 and an elastic member 382 (i.e., a coil spring). The pin 381 includes a body 3811, and expanded head 3812 formed at one end of the body 3811, and an engaging portion 3813 formed at the other end of the body 3811. The elastic member 382 is disposed around the body 3811 of the pin 381 and captured between the head 3812 and the engaging portion 3813 of the pin 381.

When the supporting bracket 31 and the base 341 of the heat sink 34 are fixed together, The rear end of the base 341 of the heat sink 34 is placed on the platforms 311 of the supporting bracket 31, with the mounting holes 345 of the base 341 being aligned with the through holes 315 of the platforms 311. The engaging portion 3813 of the pin 381 of each fastener 38 extends through the through hole 315 of one of the platforms 311 and a corresponding mounting hole 345 of base 341, and then abuts a top surface of the base 341. The elastic member 382 is deformed and compressed between the head 3812 of the pin 381 and a bottom surface of the platform 311. The compressed elastic member 382 and the engaging portion 3813 of the pin 381 cooperatively exert a compressing force on the platform 311 of the supporting bracket 31 and the base 341 of the heat sink 34 thereby firmly fixing the supporting bracket 31 and the base 341 of the heat sink 34 together.

The HDD 40 is received in and mounted to the mounting frame 32. The front end 321 of the mounting frame 32 is supported on the supporting plate 314 of the supporting bracket 31. A rear end 322 of the mounting frame 32 is fixed to a rear side plate 12 of the casing 10 (best seen in FIG. 1). A bottom of the front end 321 of the mounting frame 32 forms two engaging legs 323 adjacent to left and right ends thereof, respectively. The supporting plate 314 of the supporting bracket 31 defines two locking holes 3141 corresponding to the two engaging legs 323 of the mounting frame 32. Two baffles 316 extend upwardly from left and right ends of mounting plate 314. The two baffles 316 sandwich the front end 321 of the mounting frame 32 therebetween to prevent the mounting frame 32 from moving along a left-to-right direction. The engaging legs 323 of the mounting frame 32 are received in the locking holes 3141 and engage with a bottom surface of the mounting plate 314. The rear end of the mounting frame 32 can be fixed to the rear side plate 12 of the casing 10 via several bolts (not shown). Thus, the assembly and disassembly of the mounting frame 32 is easy and convenient.

In the computer 100, the front end 321 of the mounting frame 32 is supported by the supporting bracket 31, while the rear end of the mounting frame 32 is fixed to the rear side plate 12 of the casing 10. The mounting frame 32 and the HDD 40 mounted thereon are firmly mounted in the casing 10 of the computer 100 and spans above the motherboard 20. The motherboard 20 can extend to a portion below the mounting frame 32. An inner space of the casing 10 is sufficiently utilized. Therefore, the computer 100 incorporating the HDD mounting structure 30 according to the disclosure can have a relatively small size.

In addition, the supporting bracket 31 is fixed to the base 341 of the heat sink 34 via the fasteners 38. Thus the heat sink 34 and the supporting bracket 31 are together mounted on the motherboard 20 of the computer 100 only by several fasteners 37. The number of the holes defined in the motherboard 20 is reduced.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hard disk drive mounting structure for supporting a hard disk drive, comprising:
   a heat dissipation apparatus comprising a base adapted for attaching to a heat-generating component;
   a mounting frame adapted for supporting the hard disk drive thereon; and
   a supporting bracket connected between the mounting frame and the base of the heat dissipation apparatus, a bottom end of the supporting bracket being fixed to the base, a top end of the supporting bracket being fixed to one end of the mounting frame to support the mounting frame.

2. The hard disk drive mounting structure of claim 1, wherein the supporting bracket and the base are fixed together via a pair of fasteners.

3. The hard disk drive mounting structure of claim 2, wherein the supporting bracket comprises a pair of platforms at the bottom end thereof and a supporting plate at the top end thereof, each of the pair of platforms defining a through hole therein, the base defining a pair of mounting holes therein corresponding to the through holes of the pair of the platforms, the pair of fasteners extending through the through holes of the supporting bracket and the mounting holes of the base to fix the supporting bracket and the base together.

4. The hard disk drive mounting structure of claim 3, wherein the mounting frame forms at least one engaging leg at the one end thereof, the supporting plate of supporting bracket defining at least one locking hole corresponding to the at least one engaging leg of the mounting frame, the at least one engaging leg of the mounting frame being received in the at least one of the locking hole of the supporting bracket.

5. The hard disk drive mounting structure of claim 3, wherein two baffles extend upwardly from two opposite ends of mounting plate, the two baffles sandwiching the one end of the mounting frame therebetween.

6. The hard disk drive mounting structure of claim 1, wherein the heat dissipation apparatus further comprises a fan, and a plurality of fins arranged on the base defining air passages therebetween, the fan being located at an end of the base far from the supporting bracket, a portion of airflow produced by the fan flowing through the air passages defined between the fins, another portion of the airflow produced by the fan directly flowing towards the mount frame for dissipating heat of the hard disk drive mounting thereon.

7. The hard disk drive mounting structure of claim 6, wherein the heat dissipation apparatus further comprises a fan duct, the fan duct covering the fins and the fan therein, a spacing being defined between a top portion of the fan duct and top ends of the fins, the spacing be aligned with the hard disk drive for the another portion of the airflow produced by the fan directly flowing through the spacing towards the mount frame.

8. The hard disk drive mounting structure of claim 7, wherein the fan duct comprises a top plate and a pair of side plates extending downwardly from two opposite sides of the top plate, respectively, a diffluent duct being connected to one of the side plates of the fan duct.

9. A computer, comprising:
a casing comprising a fixing plate;
a motherboard accommodated in the casing and mounted on the fixing plate of the casing; and
a hard disk drive mounting structure accommodated in the casing and located above the motherboard, the hard disk drive mounting structure comprising:
a heat dissipation apparatus comprising a heat sink, the heat sink comprising a base;
a mounting frame;
a hard disk drive mounted on the mounting frame; and
a supporting bracket connected between the mounting frame and the base of the heat sink, a bottom end of the supporting bracket being fixed to the base of the heat sink, a top end of the supporting bracket being fixed to one end of the mounting frame to support the mounting frame, the other end of the mounting frame being fixed to a side plate of the casing.

10. The computer of claim 9, wherein the supporting bracket and the base of the heat sink are fixed together via a pair of fasteners.

11. The computer of claim 10, wherein the supporting bracket comprises a pair of platforms at the bottom end thereof and a supporting plate at the top end thereof, each of the pair of platforms defining a through hole therein, the base of the heat sink defining a pair of mounting holes therein corresponding to the through holes of the pair of the platforms, the pair of fasteners extending through the through holes of the supporting bracket and the mounting holes of the base of the heat sink to fix the supporting bracket and the base of the heat sink together.

12. The computer of claim 11, wherein the mounting frame forms at least one engaging leg at the one end thereof, the supporting plate of supporting bracket defining at least one locking hole corresponding to the at least one engaging leg of the mounting frame, the at least one engaging leg of the mounting frame being received in the at least one of the locking hole of the supporting bracket.

13. The computer of claim 11, wherein two baffles extend upwardly from two opposite ends of mounting plate, the two baffles sandwiching the one end of the mounting frame therebetween.

14. The computer of claim 9, wherein the heat dissipation apparatus further comprises a fan, the fan being located at an end of the heat sink far from the supporting bracket, the heat sink further comprising a plurality of parallel fins arranged on the base, an air passage being defined between every two adjacent fins, a portion of airflow produced by the fan flowing through the air passages defined between the fins, another portion of the airflow produced by the fan directly flowing towards the mount frame for dissipating heat of the hard disk drive mounting thereon.

15. The computer of claim 14, wherein the heat dissipation apparatus further comprises a fan duct, the fan duct covering the heat sink and the fan therein, a spacing being defined between a top portion of the fan duct and top ends of the fins of the heat sink, the spacing be aligned with the hard disk drive for the another portion of the airflow produced by the fan directly flowing through the spacing towards the mount frame.

16. The computer of claim 15, wherein the fan duct comprises a top plate and a pair of side plates extending downwardly from two opposite sides of the top plate, respectively, a diffluent duct being connected to one of the side plates of the fan duct.

17. The computer of claim 9, wherein the base of the heat sink is rectangular, the base defining four through holes at four corners thereof, respectively, four additional fasteners extending through the four through holes of the base to mount the heat sink on the motherboard.

\* \* \* \* \*